2,799,554
METHOD OF SEPARATING PLUTONIUM

Frank Morgan, Chalk River, Ontario, Canada, assignor, by mesne assignments, to the United States of America as represented by the United States Atomic Energy Commission No Drawing. Application September 4, 1946, Serial No. 694,834

3 Claims. (Cl. 23—14.5)

This invention relates to a method of separating plutonium from a mixture thereof with uranium and fission products of uranium, including zirconium and niobium. Such a mixture is obtained in heterogeneous or homogeneous arrangements for releasing atomic energy by means of a divergent neutron chain reaction carried out in a pile. Natural uranium serves in the pile as a source of the plutonium and fission products of uranium, and the mixture is found, in the case of a heterogeneous arrangement, in the neutron irradiated rods of uranium or, in the case of a homogeneous arrangement, in the neutron irradiated dispersion or solution of uranium compound. The fission products which are of interest from the point of view of the separation are those of relatively long life and include isotopes of zirconium, niobium, ruthenium, strontium, yttrium, cerium, praseodymium, barium and lanthanum. The total weight of these fission products in the irradiated uranium is extremely small. In a 50 kilogram irradiated uranium rod it may be of the order of 10 grams depending on the degree of irradiation.

It has previously been proposed that the separation in question be effected by co-precipitating plutonium and a carrier compound from solution, dissolving the precipitate, oxidising the plutonium from the tetravalent state ($Pu^{4+}$) to the hexavalent state ($Pu^{6+}$), and reprecipitating the carrier compound with any $Pu^{4+}$, leaving the $Pu^{6+}$ in solution. Such a method involves many cycles of operation.

According to the present invention a method of separation is provided which gives a high yield of plutonium, is convenient and does not require many cycles of operation and so requires less time than methods previously proposed.

According to copending application Serial No. 699,345 filed September 25, 1946, of the same inventor the mixture of plutonium with uranium and fission products of uranium is dissolved in nitric acid, bismuth nitrate and zirconium nitrate are added to the solution as carrier compounds, and insoluble phosphates of plutonium, zirconium, bismuth and niobium are precipitated from the solution by adding to the latter an aqueous solution of a soluble phosphate.

The method of the invention resides in the treatment of the mixed phosphate precipitate thus produced and is based on the known fact that bismuth phosphate is easily soluble in dilute hydrochloric acid and on the discovery that, in such dilute hydrochloric acid, plutonium phosphate and niobium phosphate are adsorbed on zirconium phosphate but that plutonium phosphate may be leached from the zirconium phosphate and adsorbed niobium phosphate in hydrochloric acid of a strength greater than 7 N.

The method of the invention accordingly consists in treating the above mentioned mixed phosphate precipitate first with dilute hydrochloric acid to dissolve bismuth phosphate and then treating the insoluble residue with hydrochloric acid of a strength greater than 7 N to dissolve plutonium phosphate.

The bismuth phosphate is preferably dissolved in $1\pm0.2$ N hydrochloric acid, while the plutonium phosphate is preferably dissolved in about 9 N hydrochloric acid, this strength being great enough to effect satisfactory dissolution of the plutonium without the disadvantage of having to deal with an acid which fumes.

The invention is illustrated by the following example:

1. Precipitation 1 kilogramme of irradiated uranium is dissolved in 7.2 l. concentrated $HNO_3$ and diluted to 21.5 l. volume with water. This gives a solution of 5% in uranium as nitrate, and 3 N in $HNO_3$. 85 g. bismuth and 850 mg. zirconium are added as nitrates, and precipitated at 20° C. with 8 l. of $NaH_2PO_4$ solution (at 500 g./l.). The precipitate is washed with 250 ml. of a solution of $NaH_2PO_4$ (50 g./l.), again allowed to settle, and is then separated from the solution.

2. 1st leaching

The precipitate is agitated for 2 hours with 13 l. of a solution 1 N in HCl and containing 10 g. $NaH_2PO_4$/l. This mixture is centrifuged and the solution separated. The solution is found to contain 2% of the plutonium activity and almost no $\beta$- or $\gamma$-activity.

3. 2nd leaching

The residual $Zr_3(PO_4)_4$ is agitated with 4.3 l. of 9 N HCl for 2 hours and is centrifuged. The solution obtained contains 96% of the plutonium $\alpha$-activity. The amount of uranium which follows to this stage is minute.

What I claim as my invention is:

1. The method of separating plutonium from a mixture of phosphate thereof with phosphates of zirconium, bismuth and niobium, which comprises treating said mixture with dilute hydrochloric acid to dissolve the bismuth phosphate, and treating the insoluble residue with hydrochloric acid of a strength greater than about 7 N to dissolve the plutonium phosphate.

2. The method according to claim 1, in which the strength of the dilute hydrochloric acid is $1\pm0.2$ N.

3. The method according to claim 1, in which the strength of the dilute hydrochloric acid is $1\pm0.2$ N, and the strength of the hydrochloric acid for dissolving the plutonium phosphate is about 9 N.

References Cited in the file of this patent

Mellor: Comprehensive Treatise on Inorganic and Theoretical Chemistry, vol. 12, p. 137, pub. in 1932 by Longmans, Green and Co., London.

Seidell: Solubilities of Inorganic and Metal Organic Compounds, 3rd ed., vol. 1, p. 204, pub. in 1940 by D. Van Nostrand Co., New York.

Seaborg: Chemical and Engineering News, vol. 23, pp. 2190–2193, December 10, 1945.